(12) United States Patent
Fu et al.

(10) Patent No.: US 8,452,141 B2
(45) Date of Patent: May 28, 2013

(54) OPTICAL WAVEGUIDE COUPLING DEVICE AND ASSOCIATED METHODS

(75) Inventors: Kai-Mei Camilla Fu, Palo Alto, CA (US); Michael Renne Ty Tan, Menlo Park, CA (US); Zhen Peng, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 12/847,885

(22) Filed: Jul. 30, 2010

(65) Prior Publication Data

US 2012/0027350 A1 Feb. 2, 2012

(51) Int. Cl.
*G02B 6/26* (2006.01)
*G02B 6/42* (2006.01)

(52) U.S. Cl.
USPC .............................................. 385/37; 385/31

(58) Field of Classification Search
USPC ............................................................ 385/37
See application file for complete search history.

(56) References Cited

U.S. PATENT DOCUMENTS

| | | | | |
|---|---|---|---|---|
| 3,975,082 A * | 8/1976 | Winzer | | 359/34 |
| 4,057,319 A * | 11/1977 | Ash et al. | | 385/54 |
| 4,198,117 A * | 4/1980 | Kobayashi | | 385/37 |
| 4,257,673 A * | 3/1981 | Matthijsse | | 385/37 |
| 4,362,359 A * | 12/1982 | Dammann et al. | | 385/37 |
| 4,626,069 A * | 12/1986 | Dammann et al. | | 359/569 |
| 5,048,925 A * | 9/1991 | Gerritsen et al. | | 359/569 |
| 5,093,749 A * | 3/1992 | Maeda | | 359/571 |
| 5,114,513 A * | 5/1992 | Hosokawa et al. | | 156/150 |
| 5,148,298 A * | 9/1992 | Shigeta et al. | | 349/25 |
| 5,245,596 A * | 9/1993 | Gupta et al. | | 369/44.14 |
| 5,359,684 A * | 10/1994 | Hosokawa et al. | | 385/33 |
| 5,412,506 A | 5/1995 | Feldblum et al. | | |
| 5,513,289 A * | 4/1996 | Hosokawa et al. | | 385/33 |
| 5,537,252 A * | 7/1996 | Rauch | | 359/569 |
| 5,566,024 A * | 10/1996 | Rauch | | 359/571 |
| 5,666,224 A * | 9/1997 | Wood et al. | | 359/573 |
| 6,157,488 A * | 12/2000 | Ishii | | 359/569 |
| 8,175,430 B2 * | 5/2012 | Peng et al. | | 385/37 |
| 8,265,435 B2 * | 9/2012 | Fu et al. | | 385/37 |
| 2003/0231829 A1 | 12/2003 | Meyers et al. | | |
| 2003/0235370 A1 * | 12/2003 | Taillaert et al. | | 385/50 |
| 2004/0208445 A1 * | 10/2004 | Mears et al. | | 385/37 |
| 2010/0054662 A1 | 3/2010 | Hofrichter et al. | | |
| 2012/0027350 A1 * | 2/2012 | Fu et al. | | 385/37 |

OTHER PUBLICATIONS

Wippermann et al., "Integrated free-space optical interconnect fabricated in planar optics using chirped microlens arrays", Optics Express 10765, Oct. 30, 2006, vol. 14, No. 22.
"Planar MicroLens Array (PML)", NSG Group, www.nsgeurope.com/pml.shtml, Taken from website Apr. 29, 2010.
Fattal et al., "Flat dielectric grating reflectors with focusing abilities", Nature Photonics, Jul. 2010, pp. 466-470, vol. 4.

* cited by examiner

*Primary Examiner* — Rhonda Peace

(57) ABSTRACT

The present disclosure provides optical waveguide coupling devices and associated methods. In one example, an optical waveguide coupling device can comprise a dielectric grating coupler, a first optical waveguide attached to a first surface of the dielectric grating coupler, and a second optical waveguide attached to a second surface of the dielectric grating coupler. The second optical waveguide can be oriented opposed to the first optical waveguide allowing for communication therebetween via the sub-wavelength grating. Additionally, the dielectric grating coupler can comprise a first dielectric material; a sub-wavelength grating attached to the first dielectric material, the sub-wavelength grating having a higher refractive index than the first dielectric material; and a second dielectric material optically coupled to the sub-wavelength grating.

20 Claims, 5 Drawing Sheets

OPTICAL WAVEGUIDE COUPLING DEVICE AND ASSOCIATED METHODS

BACKGROUND

An optical fiber coupler couples light into and out of an optical fiber. However, coupling light into and out of an optical fiber presents a number of problems. In the case of multimode fibers, a lens is positioned and configured to focus the light of a well-collimated beam to a spot size that is less than the diameter of the fiber core. In addition, the angle from the lens to the fiber is less than the numerical aperture ("NA") of the fiber core. In others words, the position and configuration of the lens used to inject light into the core of an optical fiber are selected to ensure that the maximal ray of the focused beam lies within the NA of the fiber core. On the other hand, in order to couple light into a single mode fiber, the mode of the fiber core and the mode of the light is nearly phase matched.

The lenses typically used to couple light into and out of either single or multimode fibers require a relatively large optical fiber coupler to house and position the lens at a fixed distance from the end of the fiber. In addition, the lens is typically the most expensive component of the optical fiber coupler.

DETAILED DESCRIPTION

Figure 1:
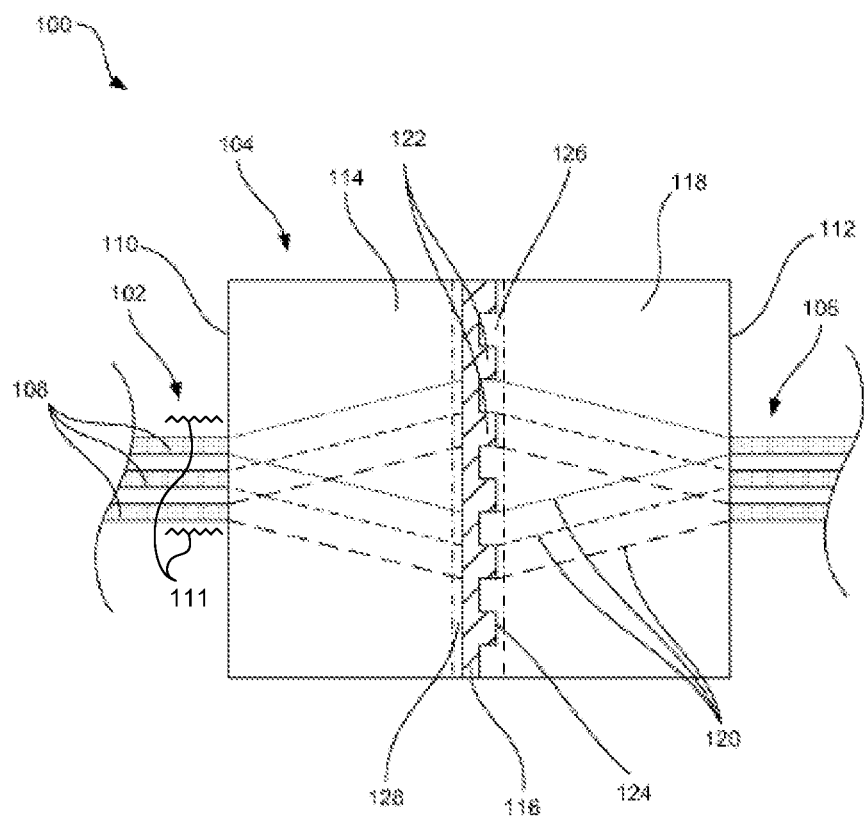
FIG. 1 is a cross-sectional view of an optical waveguide coupling device in accordance with an example of the present disclosure.

Before the present invention is disclosed and described, it is to be understood that this invention is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "optical waveguide" refers to a physical structure that guides transmission of optical energy through a defined space. In one example, an optical waveguide can comprise an optical fiber or optical fibers.

As used herein, "optical energy" refers to any type of electromagnetic energy.

As used herein, "etching" refers to any technique that allows for removal of a material to form a desired pattern. Such techniques can include wet etching (such as potassium hydroxide etching (KOH), hydrofluoric acid etching (HF), buffered oxide etching (BOE), hydrofluoric acid-nitric acid-acetic acid etching (HNA), etc), dry etching (such as reactive-ion etching (RIE), plasma, deep reactive ion etching (DRIE), reverse sputtering, etc), photo-etching, non-toxic etching, etc.

As used herein, "sub-wavelength grating" refers to a non-periodic sub-wavelength grating that acts as an optical element such as a lens, mirror, curved mirror, etc., for modifying a wavefront of optical energy. As used herein, "modifying a wavefront" can refer to the sub-wavelength grating changing the shape or direction of wavefront(s) of the optical energy. In one embodiment, the sub-wavelength grating can act as a lens by changing the shape of a wavefront of optical energy.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

It has been recognized that it would be advantageous to develop an optical waveguide coupling device suitable for a wide variety of applications. In accordance with this, devices and methods described herein can include an optical waveguide coupling device that can allow transmission of optical energy from a first optical waveguide to a second optical waveguide. As such, the present disclosure eliminates the need for expensive, difficult to fabricate, and/or bulky alignment devices, including traditional lenses. It is noted that when discussing the present devices and associated methods, each of these discussions can be considered applicable to each of these embodiments, whether or not they are explicitly discussed in the context of that embodiment. Thus, for example, in discussing a first dielectric material used in an optical waveguide coupling device, such a dielectric material can also be used in a method of coupling optical waveguides or a method for optical communication between optical waveguides, and vice versa.

In light of the above, an optical waveguide coupling device can comprise a dielectric grating coupler, a first optical waveguide attached to a first surface of the dielectric grating coupler; and a second optical waveguide attached to a second surface of the dielectric grating coupler. The dielectric grating coupler can comprise a first dielectric material, a sub-wavelength grating attached to the first dielectric material, the sub-wavelength grating having a higher refractive index than the first dielectric material, and a second dielectric material optically coupled to the sub-wavelength grating. Additionally, the second optical waveguide can be oriented opposed to the first optical waveguide allowing for communication therebetween via the sub-wavelength grating.

Additionally, a method for optical communication between optical waveguides can comprise transmitting optical energy from a first optical waveguide through a first dielectric material, modifying a wavefront of the optical energy via a sub-wavelength grating, and receiving the optical energy in a second optical waveguide. Additionally, the first optical waveguide and the second optical waveguide can be oriented such that the sub-wavelength grating aligns the optical energy therebetween.

Further, a method of coupling optical waveguides can comprise attaching a first optical waveguide to a first surface of a dielectric grating coupler, attaching a second optical waveguide to a second surface of the dielectric grating coupler. The second optical waveguide can be oriented opposed to the first waveguide, allowing for communication therebetween. The dielectric grating coupler can be any dielectric grating coupler as described herein.

Various modifications and combinations that can be derived from the present disclosure and illustrations, and as such, the following figures should not be considered limiting.

Turning now to FIG. 1, an optical waveguide coupling device 100 can generally include a first optical wave guide 102, a dielectric grating coupler 104, and a second optical waveguide 106. The first and second waveguides can comprise optical fibers 108. In one example, the first and/or second optical wave guide can comprise an array of optical fibers. In another example, the first and/or second optical waveguide can comprise a single optical fiber. Although, FIG. 1 shows optical fibers in one example, it is understood that other optical waveguides that allow for transmission of optical energy can be used. Additionally, in one example, the optical fiber can be a multimode optical fiber(s). In another example, the optical fiber can be a single mode optical fiber(s).

Figure 3:
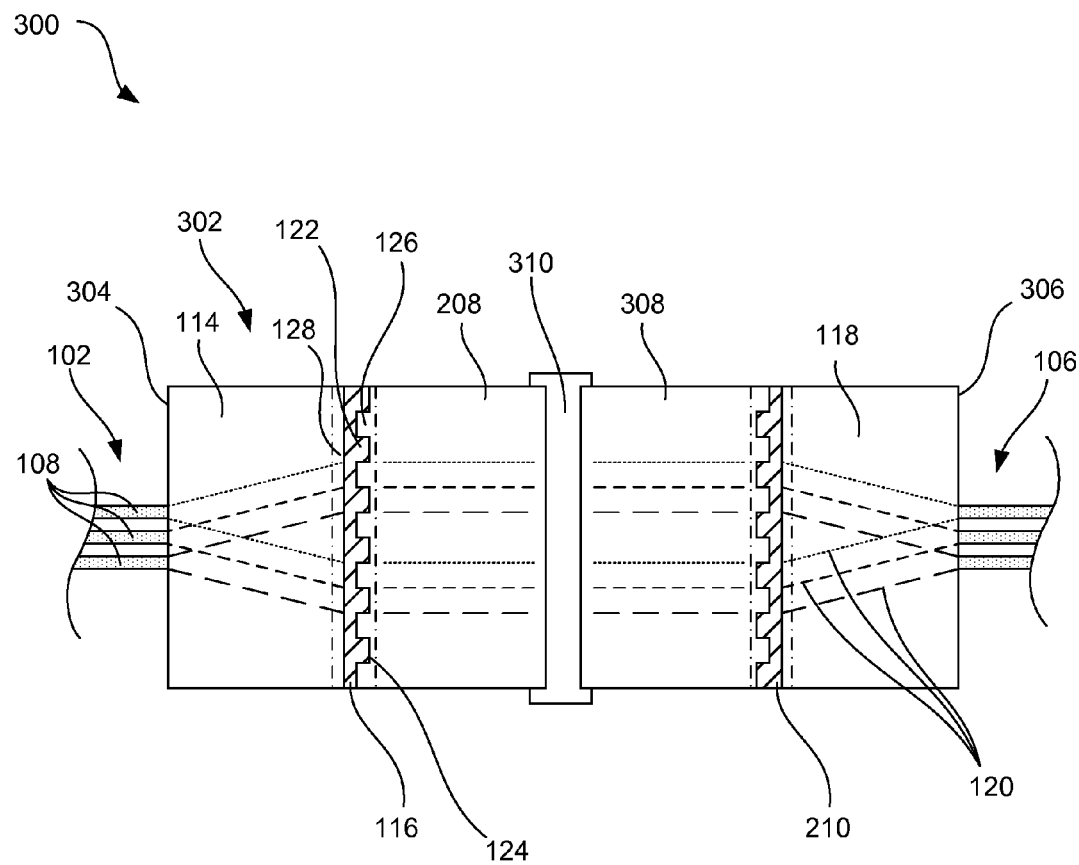
FIG. 3 is a cross-sectional view of still another optical waveguide coupling device in accordance with an example of the present disclosure.

The first optical waveguide can be attached to a first surface 110 of the dielectric grating coupler. Additionally, the second optical waveguide can be attached to a second surface 112 of the dielectric grating coupler. Attachment of a waveguide to the dielectric grating coupler can be performed mechanically or chemically, including without limitation, anodic bonding, adhesives, direct coupling including butt-coupling, etc. In one example, attachment and/or alignment can include the use of matched threaded surfaces (111) between the dielectric grating coupler and the optical waveguides and/or fibers. In one example, such matched threaded surfaces can also be part of an alignment feature 310 (as shown in FIG. 3).

The dielectric grating coupler can comprise a first dielectric material 114 attached to a sub-wavelength grating 116. The sub-wavelength grating can have a higher refractive index than the first dielectric material. A second dielectric material 118 can be optically coupled to the sub-wavelength grating. In one example, as shown in FIG. 1, the second dielectric material can be directly coupled to the sub-wavelength grating. However, such a configuration is not required, as further illustrated in FIGS. 2 and 3, discussed in detail below. Generally, the first optical waveguide can be oriented opposed to the second optical waveguide allowing for communication between the optical waveguides via the sub-wavelength grating. As such, the sub-wavelength grating of the dielectric grating coupler can modify a wavefront of the optical energy 120, which is schematically shown, transmitted from the first optical waveguide to the second optical waveguide.

The sub-wavelength grating 116 can comprise a corrugated high refractive index material. The corrugation can be performed by any technique that provides defined scattering elements 122 allowing for modification of a wavefront of optical energy, e.g., etching. The corrugated high refractive index material can be selected from the group consisting of semiconductors including silicon, GaAs, and other III-V or II-VI crystals, insulating crystals, amorphous films such as SiC, and Si—N, polymers, and mixtures thereof. In one example, the sub-wavelength grating can be fabrication by material initially deposited on the dielectric material by wafer bonding, chemical vapor deposition ("CVD"), physical vapor deposition ("PVD"), or e-beam evaporation followed by the etching. In another embodiment, the sub-wavelength grating can be formed and etched prior to attachment to the dielectric material. In both of these embodiments, the sub-wavelength grating material can be chosen to have a much higher refractive index than the subsequent dielectric material 118. In yet another embodiment, the sub-wavelength grating can be formed by etching the grating into the surface of the dielectric material provided that the dielectric material has a sufficiently higher dielectric constant than the subsequent dielectric 118. The sufficiently higher dielectric constant can allow the sub-wavelength grating to modify a wavefront of optical energy.

The sub-wavelength grating 116 can be part of or attached to the first dielectric material 114 mechanically or chemically, including without limitation, anodic bonding, adhesives, etc. Additionally, the etched surface 124 of the sub-wavelength grating can be attached to a subsequent dielectric material (such as the second dielectric material 118 as shown in FIG. 1) mechanically or chemically, including without limitation, anodic bonding, adhesives, etc. As such, the interface 126 between the etched surface and any subsequent dielectric material or the interface 128 between the sub-wavelength grating and any subsequent dielectric material can include an adhesive, dielectric material, air, or combination thereof. In one example, the interface(s) can comprise an adhesive. In another example, the interface(s) can comprise adhesive and air. Additionally, the subsequent dielectric material can be deposited and then planarized or polished to remove corrugations after deposition.

The first dielectric material 114 and second dielectric material 118 can be individually selected from the group of: silicon, GaAs, and other III-V or II-VI crystals, insulating crystals, III-V semiconductor alloys, amorphous films such as SiC, and Si—N, polymers, and mixtures thereof. In one example, the first dielectric material and the second dielectric material can be the same. In another example, the first dielectric material and the second dielectric material can be different.

The combination of the materials can provide a desired refractive differential. In one example, the sub-wavelength grating 116 can have a refractive index that is at least 0.5 higher than the first and/or subsequent dielectric material 118. In another example, the sub-wavelength grating can have a refractive index that is at least 2.0 higher than the first and/or subsequent dielectric material. Generally, the device can allow for transmission of optical energy 120 from the first optical waveguide 102 to the second waveguide 106. The optical energy can have a wavelength from 10 nm to 100 μm in one embodiment. In another example, the optical energy can have a wavelength within the visible and near infrared light range. For embodiments having more than one dielectric material, including interfaces between a grating and dielectric material, the overall difference between the grating and the subsequent materials can be sufficient to modify a wavefront of the optical energy being transmitted. In one embodiment, the overall difference can be 0.5. In another embodiment, the overall difference can be 2.0.

Figure 2:
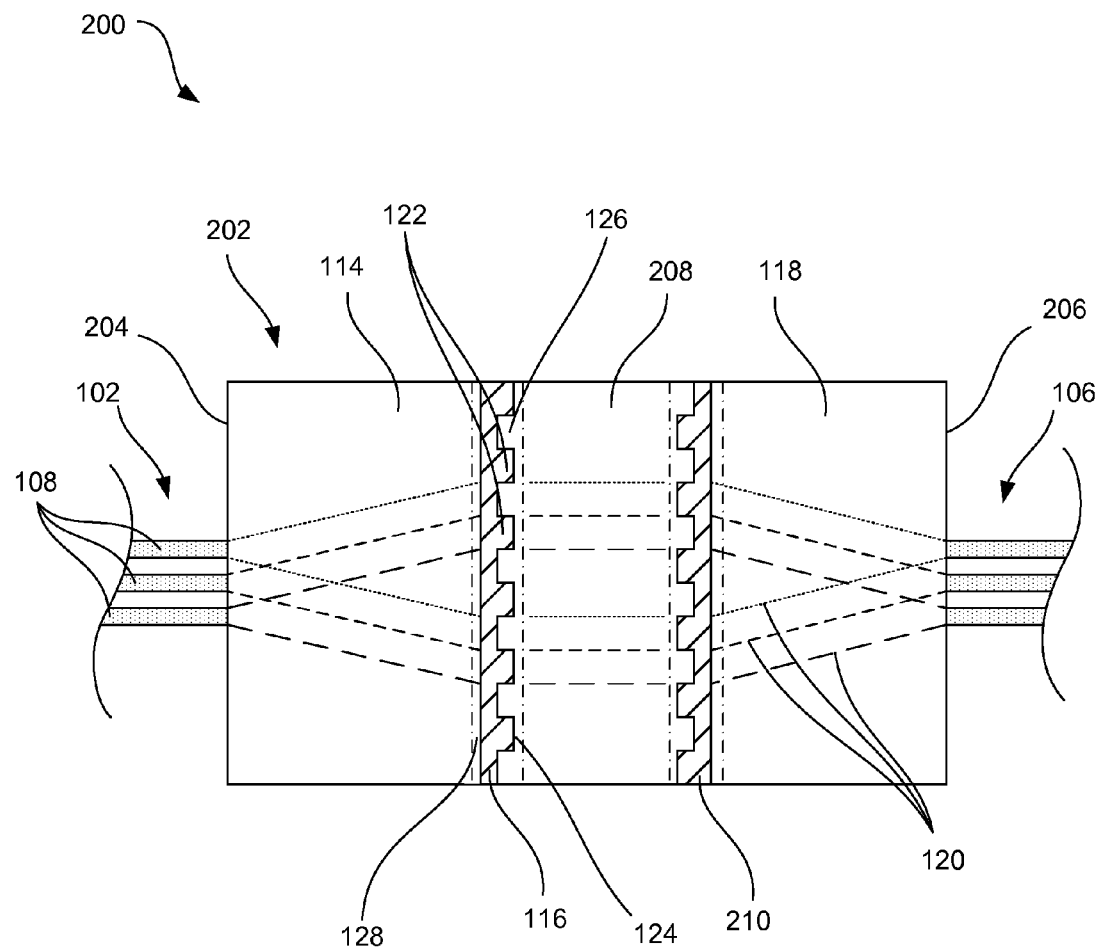
FIG. 2 is a cross-sectional view of another optical waveguide coupling device in accordance with an example of the present disclosure.

Turning now to FIG. 2, an optical waveguide coupling device 200 can generally include a first optical wave guide 102, a dielectric grating coupler 202, and a second optical waveguide 106. The first and second waveguides can comprise optical fibers 108. The first optical waveguide can be attached to a first surface 204 of the dielectric grating coupler. Additionally, the second optical waveguide can be attached to a second surface 206 of the dielectric grating coupler.

The dielectric grating coupler can comprise a first dielectric material 114 attached to a sub-wavelength grating 116. The sub-wavelength grating can have a higher refractive index than the first dielectric material. A second dielectric material 118 can be optically coupled to the sub-wavelength grating. Generally, the first optical waveguide can be oriented opposed to the second optical waveguide allowing for communication between the optical waveguides via the sub-wavelength grating. The dielectric grating coupler can further comprise a third dielectric material 208 optically coupled to the first dielectric material. Additionally, a second sub-wavelength grating 210 can be attached to the second dielectric material. The second sub-wavelength grating can have a higher refractive index than the second and/or third dielectric material. As such, the sub-wavelength grating 116 and the second sub-wavelength grating 210 of the dielectric grating coupler can modify a wavefront of the optical energy 120, which is schematically shown, transmitted from the first optical waveguide to the second optical waveguide. Scattering elements 122, etched surface 124, and interface 126 are also present (at both the first and second sub-wavelength grating) and can be configured as described in FIG. 1 above.

Turning now to FIG. 3, an optical waveguide coupling device 300 can generally include a first optical wave guide 102, a dielectric grating coupler 302, and a second optical waveguide 106. The first and second waveguides can comprise optical fibers 108. The first optical waveguide can be attached to a first surface 304 of the dielectric grating coupler. Additionally, the second optical waveguide can be attached to a second surface 306 of the dielectric grating coupler.

The dielectric grating coupler can comprise a first dielectric material 114 attached to a sub-wavelength grating 116. The sub-wavelength grating can have a higher refractive index than the first and/or subsequent dielectric material. A second dielectric material 118 can be optically coupled to the sub-wavelength grating. Generally, the first optical waveguide can be oriented opposed to the second optical waveguide allowing for communication between the optical waveguides via the sub-wavelength grating. The dielectric grating coupler can further comprise a third dielectric material 208 optically coupled to the first dielectric material, a fourth dielectric material 308 optically coupled to the second dielectric material, and a second sub-wavelength grating 210 attached to the second dielectric material. The second sub-wavelength grating can have a higher refractive index than the second and/or fourth dielectric material. As such, the sub-wavelength grating 116 and the second sub-wavelength grating 210 of the dielectric grating coupler can modify a wavefront of the optical energy 120, which is schematically shown, transmitted from the first optical waveguide to the second optical waveguide. Additionally, the dielectric grating coupler can include an alignment feature 310. The alignment feature can align the dielectric materials allowing for communication between optical waveguides. As such, the alignment feature can provide a simple and cost effective structure of alignment after the optical waveguides have been attached to the dielectric grating coupler. Scattering elements 122, etched surface 124, and interface 126 are also present (at both the first and second sub-wavelength grating) and can be configured as described in FIG. 1 above.

Figure 4:
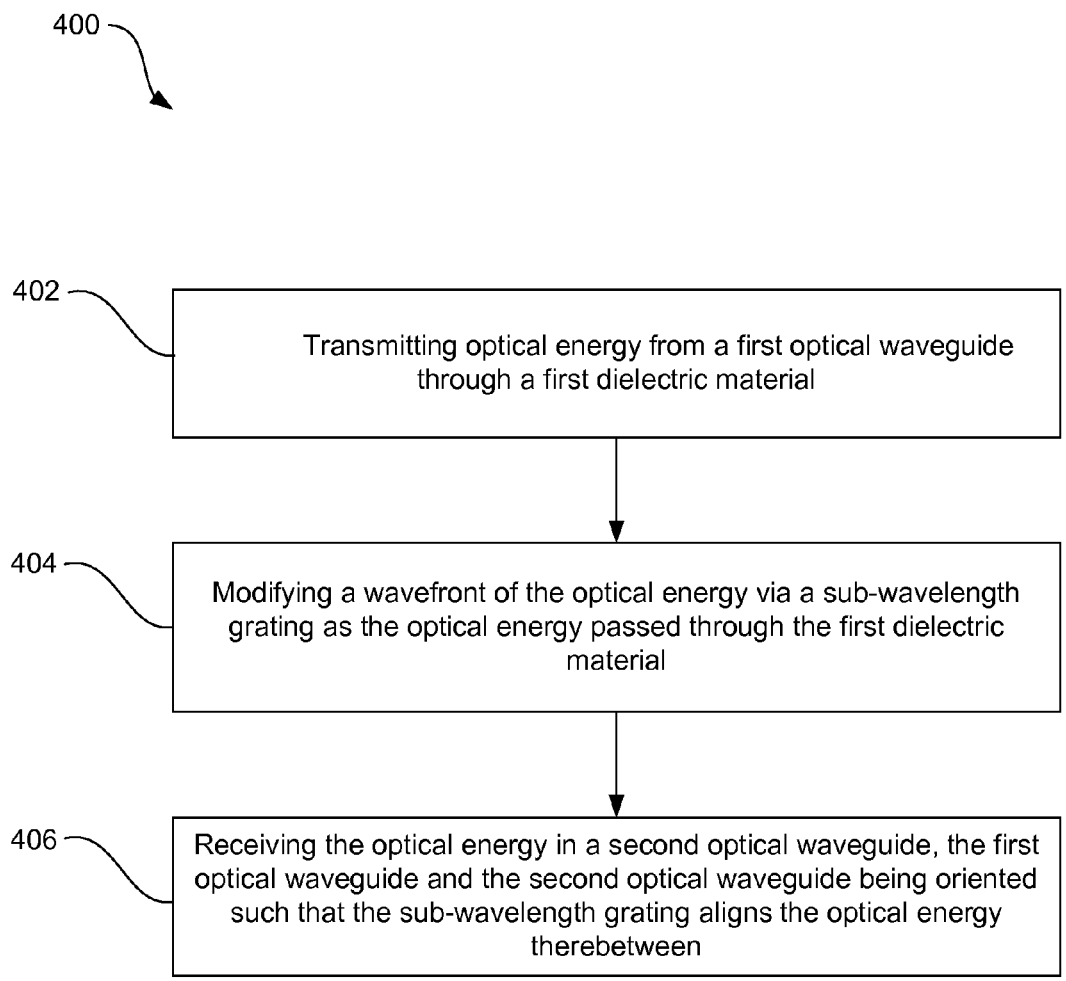
FIG. 4 is a flow chart setting forth a method in accordance with an embodiment of the present disclosure.

Turning now to FIG. 4, a method 400 for optical communication between optical waveguides can comprise transmitting optical energy from a first optical waveguide through a first dielectric material 402, modifying a wavefront of the optical energy via a sub-wavelength grating after the optical energy has passed through the first dielectric material 404, and receiving the optical energy in a second optical waveguide 406. The first optical waveguide and the second optical waveguide can be oriented such that the sub-wavelength grating aligns the optical energy therebetween.

The method can further comprise transmitting the optical energy through a second dielectric material after modifying a wavefront of the optical energy and before receiving the optical energy in the second waveguide. Additionally, the method can further comprise transmitting the optical energy through a third dielectric material after modifying a wavefront of the optical energy, then further modifying a wavefront of the optical energy through a second sub-wavelength grating, and then transmitting the optical energy through a second dielectric material before receiving the optical energy in the second waveguide. In one example, the method can further comprise transmitting the optical energy through a third dielectric material after modifying a wavefront of the optical energy, then transmitting the optical energy through a fourth dielectric material, then further modifying a wavefront of the optical energy through a second sub-wavelength grating, and then transmitting the optical energy through a second dielectric material before receiving the optical energy in the second waveguide. In another example, the method can further comprise the step of aligning the third dielectric material and the fourth dielectric material via an alignment feature.

The optical communication described herein can be bidirectional. As such, the first and/or second waveguides can receive and/or transmit optical energy. In one example, the method can further comprise transmitting optical energy from the second optical waveguide through a second dielectric material, modifying a wavefront of the optical energy through the sub-wavelength grating after the optical energy has passed through the second dielectric material, and receiving the optical energy in the first optical waveguide.

Figure 5:
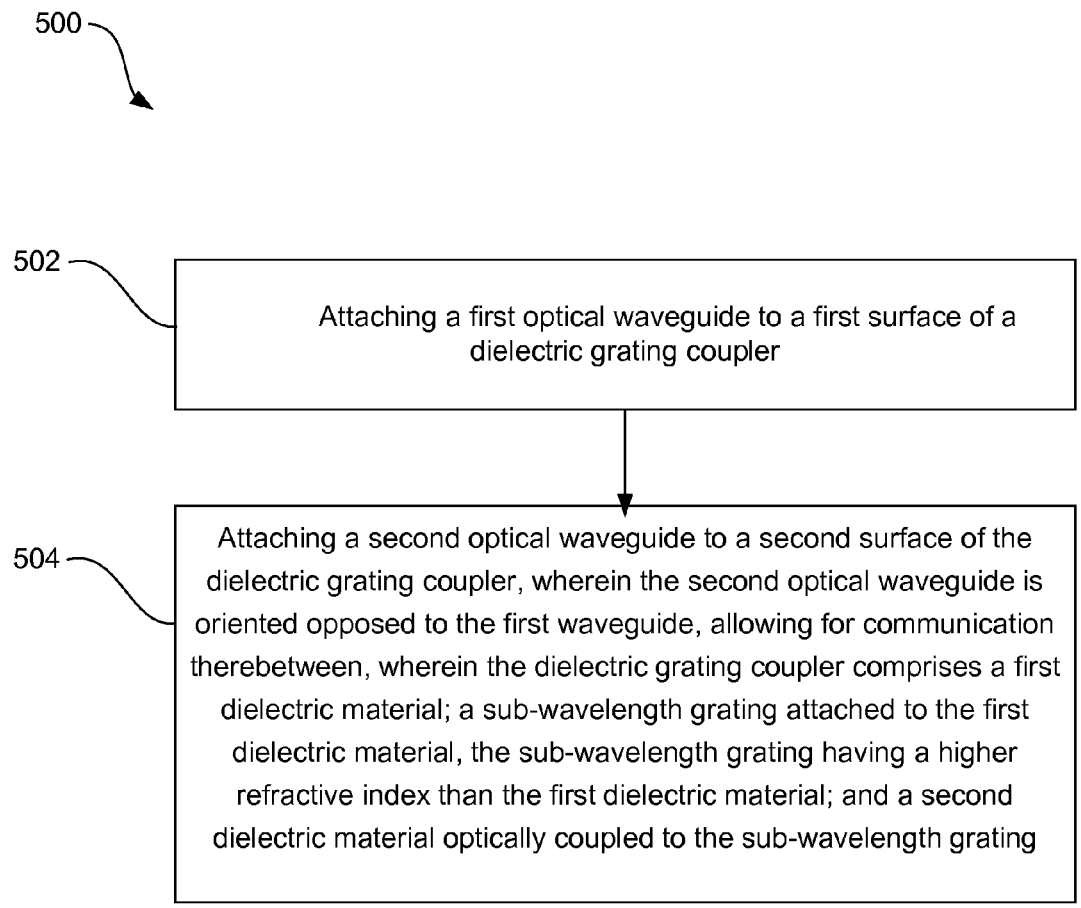
FIG. 5 is a flow chart setting forth a method in accordance with an embodiment of the present disclosure.

Turning now to FIG. 5, a method 500 of coupling optical waveguides can comprise attaching a first optical waveguide to a first surface of a dielectric grating coupler 502, and attaching a second optical waveguide to a second surface of the dielectric grating coupler 504. As discussed herein, the second optical waveguide can be oriented opposed to the first waveguide, allowing for communication therebetween. Additionally, the dielectric grating coupler can comprise a first dielectric material; a sub-wavelength grating attached to the first dielectric material, the sub-wavelength grating having a higher refractive index than the first dielectric material; and a second dielectric material optically coupled to the sub-wavelength grating. The method can further comprise transmitting optical energy from the first optical waveguide to the second optical waveguide. Additionally, the method can further comprise aligning the optical waveguides with an alignment feature.

In summary and to reiterate to some degree, the present disclosure provides optical waveguide coupling devices that allow optical communication between optical waveguides. It is noted that these methods and devices can be modified independently of one another. Additionally, the present devices and methods can provide for increased functionality and decreased cost with regarding to coupling of optical systems.

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:
1. An optical waveguide coupling device, comprising
 a dielectric grating coupler; comprising:
  a first dielectric material,
  a non-periodic sub-wavelength grating on the first dielectric material, the sub-wavelength grating having a higher refractive index than the first dielectric material, and
  a second dielectric material optically coupled to the sub-wavelength grating;
 a first optical waveguide attached to a first surface of the dielectric grating coupler; and a second optical waveguide attached to a second surface of the dielectric grating coupler, wherein the second optical waveguide is oriented opposed to the first optical waveguide, allowing for communication therebetween via the sub-wavelength grating.

2. The device of claim 1, wherein the sub-wavelength grating comprises a corrugated high refractive index material.

3. The device of claim 2, wherein the corrugated high refractive index material is selected from the group of silicon compounds, III-V semiconductor alloys, polymers, and mixtures thereof.

4. The device of claim 1, wherein the sub-wavelength grating has a refractive index that is at least 2.0 higher than the first or second dielectric material.

5. The device of claim 1, wherein the non-periodic sub-wavelength grating is etched into a surface of the first dielectric material, said first dielectric material having a dielectric constant higher than a dielectric constant of said second dielectric material.

6. The device of claim 1, wherein the first dielectric material and second dielectric material are individually selected from the group of silicon compounds, III-V semiconductor alloys, polymers, and mixtures thereof.

7. The device of claim 1, further comprising:
third and fourth dielectric materials between which is a second non-periodic sub-wavelength grating; and
an alignment device for aligning the third and fourth dielectric materials with the first and second dielectric materials allowing for optical communication through both gratings and the four dielectric materials.

8. The device of claim 1, further comprising a matched threaded surface for securing a said waveguide to said optical waveguide coupling device.

9. The device of claim 1, wherein the dielectric grating coupler further comprises a third dielectric material optically coupled to the first dielectric material and a second sub-wavelength grating attached to the second dielectric material, the second sub-wavelength grating having a higher refractive index than the second dielectric material or third dielectric material.

10. The device of claim 1, wherein the dielectric grating coupler further comprises a third dielectric material optically coupled to the first dielectric material, a fourth dielectric material optically coupled to the second dielectric material, and a second sub-wavelength grating attached to the second dielectric material, the second sub-wavelength grating having a higher refractive index than the second dielectric material or fourth dielectric material, and wherein the sub-wavelength grating has a higher refractive index than the first dielectric material or the third dielectric material.

11. The device of claim 10, wherein the dielectric grating coupler further comprises an alignment feature.

12. A method for optical communication between optical waveguides, comprising:
transmitting optical energy from a first optical waveguide through a first dielectric material;
modifying a wavefront of the optical energy via a non-periodic sub-wavelength grating as the optical energy passes through the first dielectric material; and
receiving the optical energy in a second optical waveguide, the first optical waveguide and the second optical waveguide being oriented such that the sub-wavelength grating aligns the optical energy therebetween.

13. The method of claim 12, further comprising transmitting the optical energy through a second dielectric material after modifying the wavefront of the optical energy and before receiving the optical energy in the second waveguide.

14. The method of claim 12, further comprising transmitting the optical energy through a third dielectric material after modifying the wavefront of the optical energy, then further modifying a wavefront of the optical energy through a second sub-wavelength grating, and then transmitting the optical energy through a second dielectric material before receiving the optical energy in the second waveguide.

15. The method of claim 12, further comprising transmitting the optical energy through a third dielectric material after modifying the wavefront of the optical energy, then transmitting the optical energy through a fourth dielectric material, then further modifying a wavefront of the optical energy through a second sub-wavelength grating, and then transmitting the optical energy through a second dielectric material before receiving the optical energy in the second waveguide.

16. The method of claim 15, further comprising the step of aligning the third dielectric material and the fourth dielectric material via an alignment feature.

17. The method of claim 12, wherein the optical communication is bidirectional.

18. The method of claim 17, further comprising:
transmitting optical energy from the second optical waveguide through a second dielectric material;
modifying a wavefront of the optical energy through the sub-wavelength grating after the optical energy has passed through the second dielectric material; and
receiving the optical energy in the first optical waveguide.

19. A method of coupling optical waveguides, comprising:
attaching a first optical waveguide to a first surface of a dielectric grating coupler; and
attaching a second optical waveguide to a second surface of the dielectric grating coupler, wherein the second optical waveguide is oriented opposed to the first waveguide, allowing for communication therebetween;
wherein the dielectric grating coupler comprises:
a first dielectric material;
a non-periodic sub-wavelength grating attached to the first dielectric material, the sub-wavelength grating having a higher refractive index than the first dielectric material; and
a second dielectric material optically coupled to the sub-wavelength grating.

20. The method of claim 19, further comprising transmitting optical energy from the first optical waveguide to the second optical waveguide.

* * * * *